(12) United States Patent
McIntyre et al.

(10) Patent No.: US 11,611,266 B2
(45) Date of Patent: Mar. 21, 2023

(54) AUTOMATED RECOVERY OF RARE EARTH PERMANENT MAGNETS FROM ELECTRIC MACHINES

(71) Applicant: UT-Battelle, LLC, Oak Ridge, TN (US)

(72) Inventors: Timothy J. McIntyre, Oak Ridge, TN (US); Jonathan J. Harter, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 660 days.

(21) Appl. No.: 16/718,388

(22) Filed: Dec. 18, 2019

(65) Prior Publication Data

US 2020/0195101 A1 Jun. 18, 2020

Related U.S. Application Data

(60) Provisional application No. 62/781,089, filed on Dec. 18, 2018.

(51) Int. Cl.
| | |
|---|---|
| *H02K 15/00* | (2006.01) |
| *B25J 9/16* | (2006.01) |
| *B65G 47/52* | (2006.01) |

(52) U.S. Cl.
CPC .......... *H02K 15/0006* (2013.01); *B25J 9/163* (2013.01); *B65G 47/52* (2013.01)

(58) Field of Classification Search
CPC ...... H02K 15/0006; B25J 9/163; B65G 47/52
See application file for complete search history.

(56) References Cited

U.S. PATENT DOCUMENTS 6,568,612 B1 * 5/2003 Aoki ...................... B03B 9/061
                                                              241/20
7,534,980 B2    5/2009 Wilgen et al.
(Continued)

FOREIGN PATENT DOCUMENTS

| CN | 201259811 Y | | 6/2009 |
|---|---|---|---|
| DE | 0582962 | * | 2/1997 |

(Continued)

OTHER PUBLICATIONS

Simon et al., CIRP Life Cycle Engineering (LCE) Conference, Apr. 30-May 2, 2018, parges 916-920. (Year: 2018).*

(Continued)

*Primary Examiner* — Peter Dungba Vo
*Assistant Examiner* — Jose K Abraham
(74) *Attorney, Agent, or Firm* — Warner Norcross + Judd LLP

(57) ABSTRACT

A method for the automated recovery of rare earth permanent magnets from electric machines are provided. The method includes identifying electric machines in a mixed product stream for performing a unique robotic disassembly routine. Electric machines that are not identified are diverted to a robot training station, during which time the system and the method include implementing a suitable disassembly routine. A conveyor delivers the remaining electric machines to a rotary platform having multiple stations for the simultaneous disassembly of multiple electric machines. Permanent magnets are removed from the electric machines and are then sorted for recycling operations.

9 Claims, 4 Drawing Sheets

(56) References Cited

U.S. PATENT DOCUMENTS

| | | | |
|---|---|---|---|
| 9,095,940 B2* | 8/2015 | Zakotnik | H01F 41/0266 |
| 11,230,752 B2* | 1/2022 | McIntyre | B09B 3/00 |
| 2003/0029697 A1 | 2/2003 | Green et al. | |
| 2009/0321511 A1* | 12/2009 | Browne | H01M 10/54 |
| | | | 705/308 |
| 2014/0366687 A1 | 12/2014 | Zakotnik et al. | |
| 2015/0068030 A1* | 3/2015 | Zakotnik | B22F 1/0003 |
| | | | 29/762 |
| 2015/0294786 A1* | 10/2015 | Zakotnik | H01F 1/0536 |
| | | | 419/33 |
| 2017/0128954 A1* | 5/2017 | McIntyre | B23K 26/40 |
| 2020/0270725 A1* | 8/2020 | McIntyre | C22B 59/00 |

FOREIGN PATENT DOCUMENTS

| | | | |
|---|---|---|---|
| JP | 2002186224 A * | 6/2002 | |
| JP | 2002187030 A * | 7/2002 | |
| JP | 2012041575 A * | 3/2012 | |
| WO | WO-2007112577 A1 * | 10/2007 | B03B 9/061 |
| WO | 2012/101398 A1 | 8/2012 | |

OTHER PUBLICATIONS

"Smart Camera Integration in Machine Vision Systems," ThomasNet Jan. 24, 2012 [online], [retrieved Mar. 1, 2017]. URL: https://web.archive.org/web/20120124060248/http://www.thomasnet.com/articles/automation-electronics/smart-camera-machine-vision-system. (Year:2012.

Daniels, Design and Implementation of a Hall Effect Sensor Array Applied to Recycling Hard Drive Magnets, IEEE SoutheastCon 2015, Apr. 9-12, 2015 (Year: 2015).

PCT/US16/59970 International Search Report and Written Opinion dated Jan. 26, 2017.

* cited by examiner

AUTOMATED RECOVERY OF RARE EARTH PERMANENT MAGNETS FROM ELECTRIC MACHINES

CROSS-REFERENCE TO RELATED APPLICATIONS

This application claims the benefit of U.S. Provisional Application No. 62/781,089, filed Dec. 18, 2018, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to methods and systems for recovering rare earth permanent magnets from electric machines and other end-of-life products.

BACKGROUND OF THE INVENTION

Rare earth elements (REEs) are abundant in nature but are difficult and expensive to acquire. REEs include seventeen chemical elements, specifically fifteen lanthanides, scandium and yttrium. Most REEs in commercial use today are produced from mining operations. These materials are used in the manufacture of magnets for electric motors, hard drives, refrigeration compressors, generators, power tools and many other consumer goods.

The demand for REEs is expected to increase while natural supplies remain limited. Electric motors are a prime target for permanent magnet recovery, however. There exists large quantities of electric motors available for recycling, and each electric motor may contain several kilograms of permanent magnets. For example, Nissan electric vehicle motors were found by the inventors to include approximately 2.26 kg of neodymium iron boron (Nd—Fe—B) permanent magnets, and Toyota and ABB (Baldor) electric motors were found to include approximately 1.15 kg and 0.5 kg of Nd—Fe—B permanent magnets, respectively.

Electric vehicle motors are typically not refurbished like their internal combustion engine counterparts. Instead, electric vehicle motors are often shredded, then separated into ferrous and non-ferrous recovery streams by conventional electromagnetic and mechanical separation methods. Recovered streams include steel, aluminum, and copper with residual non-metallic streams discarded into landfills. Accordingly, there remains a need for methods and systems for the recovery of REE permanent magnets from electric motors and other end-of-life products. In particular, there remains a need for high throughput, cost-effective methods and systems for the recovery of REE permanent magnets from automobile drivetrains, industrial motors, and other electric machines.

SUMMARY OF THE INVENTION

A method and a system for the automated recovery of rare earth permanent magnets from electric machines are provided. The method and the system include identifying electric machines in a mixed product stream, and, for each electric machine, performing a unique robotic disassembly routine. Electric machines that are not identified are diverted to a robot training station, during which time the method and the system include creating a unique identifier for the electric machine and implementing a suitable disassembly routine. A conveyor delivers the remaining electric machines to a rotary platform, for example, having multiple stations for the simultaneous disassembly of multiple electric machines. Permanent magnets or magnetic material are demagnetized, extracted, and sent to be processed into new magnets. The method and the system are well suited for the recovery of waste permanent magnets and can provide a cost-effective approach for the automated recovery of permanent magnets from electric motors and other end-of-life products. The present invention also implements a holistic approach to value recovery by harvesting all economic value streams in addition to magnets (e.g., from a Nissan Leaf drivetrain, steel, aluminum, printed circuit boards, copper, and nickel are recovered).

In one embodiment, the method includes transporting electric machines along a primary conveyor, the electric machines including at least two dissimilar models. The method further includes determining, for each electric machine, whether an associated disassembly routine is stored to computer readable memory. Those electric machines having an associated disassembly routine are transported to a primary disassembly station, while those electric machines lacking an associated disassembly routine are diverted to a robot training station. The electric machines are disassembled at the primary disassembly station, and magnetic material is separated from non-magnetic material at a post-removal sorting station. The method further includes developing a disassembly routine for those electric machines lacking a disassembly routine and updating a database for disassembly of subsequent electric machines of the same model.

In another embodiment, the system includes a pre-removal sorting station, a central controller, a primary disassembly station, a post-removal sorting station, and a robot training station. The pre-removal sorting station includes an identification unit to scan an identifier associated with each of a plurality of electric machines. The central controller is operable to determine if a disassembly routine is associated with each electric machine. The primary disassembly station includes a primary rotating platform and a plurality of satellite platforms for the disassembly of electric machines into subassemblies according to an associated disassembly routine. The post-removal sorting station is operable to separate the subassemblies into magnetic material value streams and non-magnetic material value streams. Lastly, the robot training station is operable to develop a disassembly routine for those electric machines lacking a disassembly routine for later use at the primary disassembly station.

These and other features and advantages of the present invention will become apparent from the following description of the invention, when viewed in accordance with the accompanying drawings and appended claims.

DETAILED DESCRIPTION OF THE CURRENT EMBODIMENTS

Figure 1:
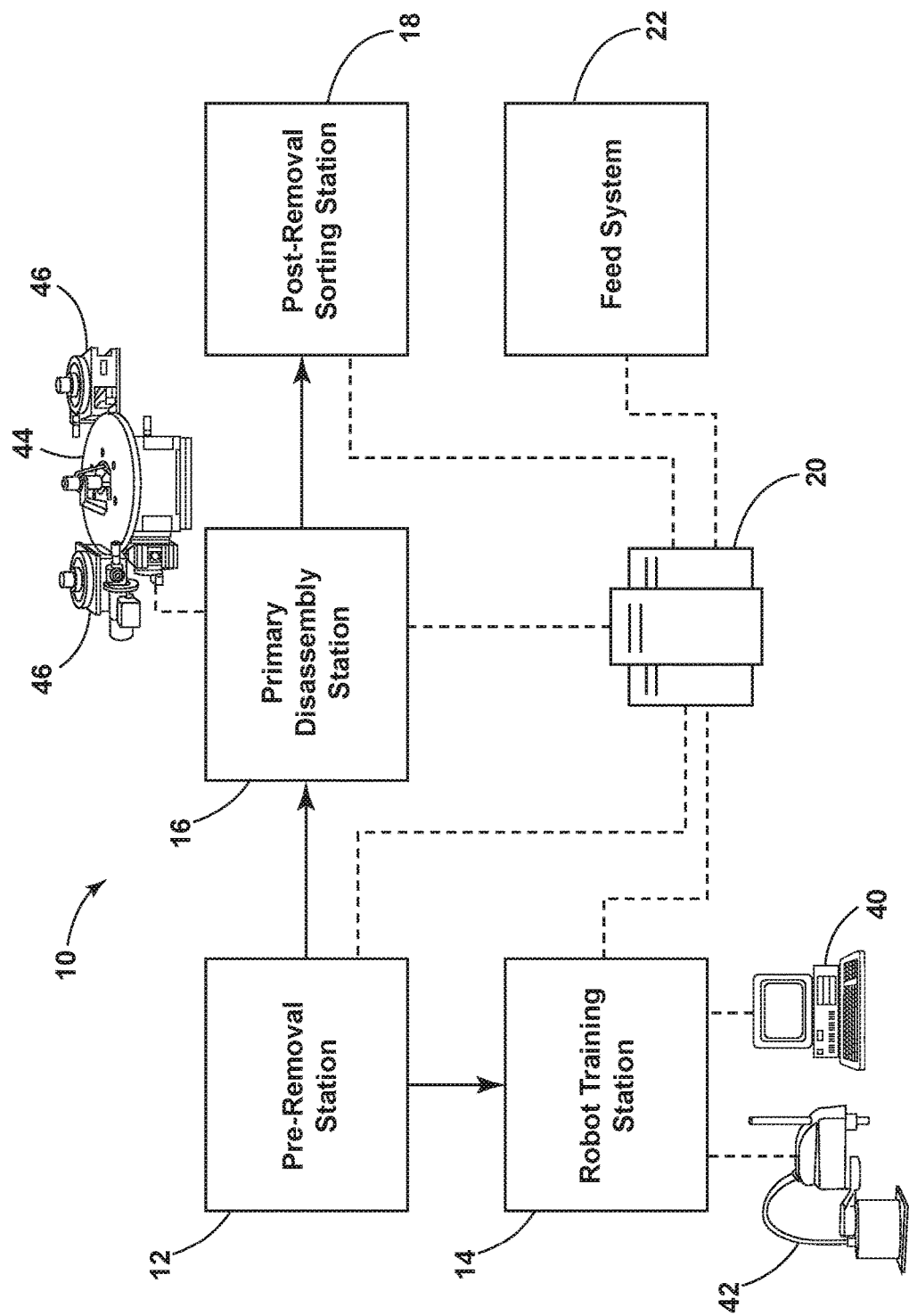
FIG. 1 is a block diagram of a system for the recovery of rare earth permanent magnets from electric machines.

With reference to FIG. 1, a system for the recovery of rare earth permanent magnets is illustrated and generally designated 10. The system 10 includes a pre-removal station 12, a robot training station 14, a primary disassembly station 16, and a post-removal station 18, each functioning pursuant to commands from a central controller 20. A feed system 22 is adapted to transport workpieces through each of the foregoing stations. The foregoing stations and the feed system are closely integrated, often with a degree of overlap, to provide the continuous removal of rare earth permanent magnets from waste electric machines at relatively high speeds. The system also produces, as a byproduct of magnet recovery, streams of steel, aluminum, printed circuit boards, copper, and nickel alloys.

More particularly, the feed system 22 is adapted to transport waste electric machines in a mixed product stream. As used herein, a "mixed product stream" means a continuous or discontinuous run of at least two different types (models) of electric machines. For example, a mixed product stream can include a first plurality of electric motors (or a first model) from a first automotive manufacture and a second plurality of electric machines (or a second model) from a second automotive manufacturer. Each electric machine is generally mounted to a carriage, specific to that model of electric machine, by bolt holes, hooks, mounting pins, or grip points. As alternatively shown in connection with FIG. 4, discussed below, the carriage can be transported by autonomous guided vehicles (AGVs) or other transfer robots.

Figure 2:
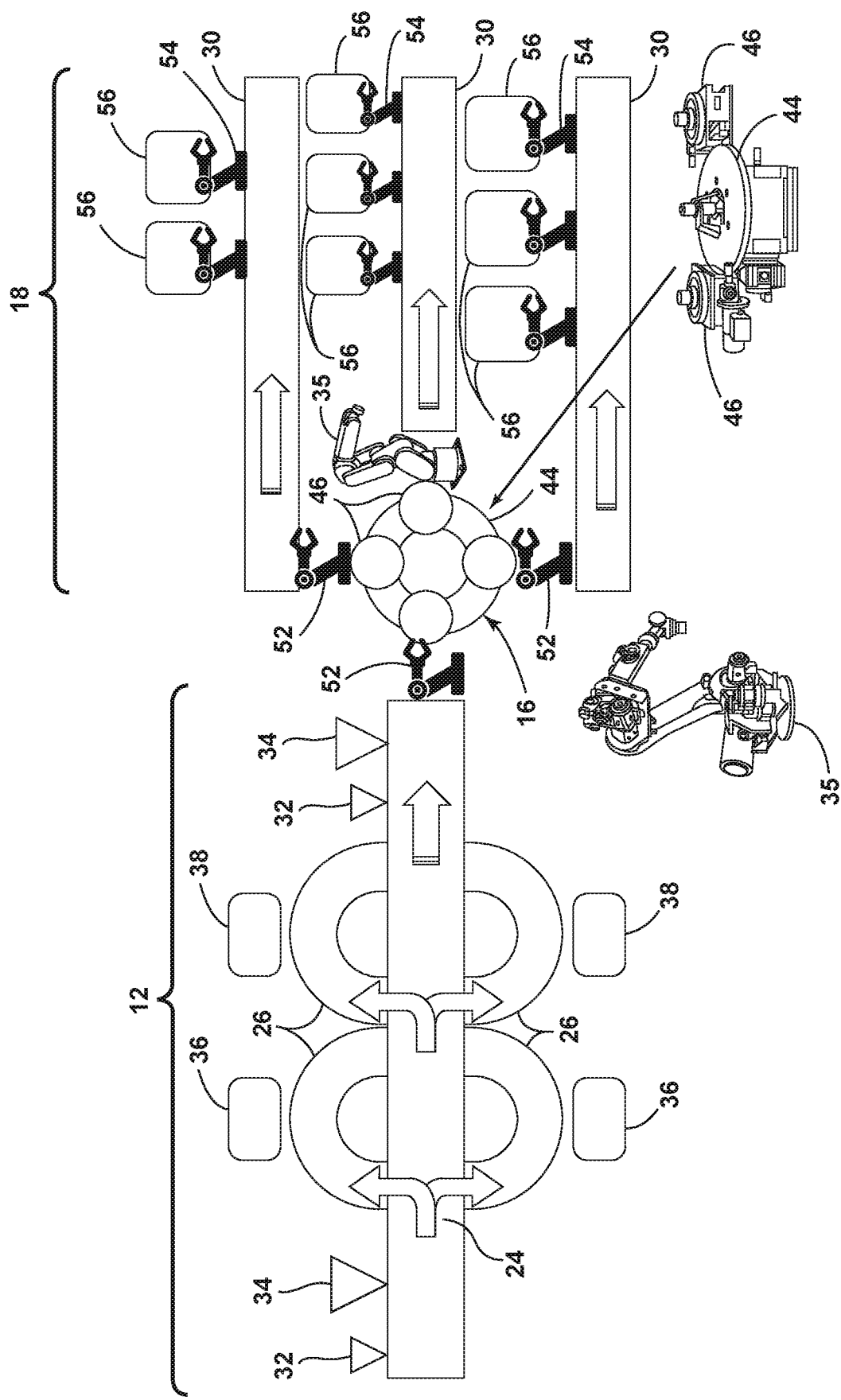
FIG. 2 is schematic diagram of a system for the recovery of rare earth permanent magnets from electric machines.

Shown in FIG. 2, a first stage of the feed system 22 is within the pre-removal station 12 includes a primary conveyor 24 and one or more side conveyors 26 to remove and collect electrical cables, process fluids, etc., in various receptacles 36, 38. A second stage of the feed system 22 is within the primary disassembly station 16 and includes a rotary turntable 44. A third stage of the feed system 22 is within the post-removal sorting station 18 and includes sub-assembly conveyors 30 for diverting one component to one or more bins, chutes, or other receptacles 56. Each stage of the feed system 22 is operable in response to the central controller 20. The pre-removal sorting station 12 is generally adapted to separate out those electric machines which are not identified as having a known robotic disassembly routine, while the remaining electric machines proceed, via the primary conveyor 24, to the primary disassembly station 16. Part tracking sensors 32 track each electric machine on the primary conveyor 24, optionally including an LED emitter and detector pair. In one example, each part tracking sensor 32 outputs a signal in response to the occlusion of LED light by a passing electric machine. The central controller 20 then determines the approximate time each electric machine passes by the part tracking sensor. Using this information, the central controller 20 generates a registry in computer memory for each electric machine in the mixed product stream.

The registry is updated for each electric machine based on the output of an automated identification unit 34. The automated identification unit 34 is adapted to determine the model of each passing electric machine, sufficient to allow the central controller 20 to determine whether a disassembly routine is available to the primary disassembly station 16, the disassembly routine being stored to a database that is accessible to the central controller 20. Each electric machine can include a computer readable identifier, for example a bar code, a quick response (QR) code, a radio frequency identification (RFID) tag, or a near field communication (NFC) tag. The automated identification unit 34 provides the model of each electric machine to the central controller 20, which then updates the registry for each electric machine. Electric machines that are determined by the central controller 20 as having a known disassembly routine (stored to the database) are routed to preparation stations via one or more side conveyors 26 for the automated removal of fluids, the automated discharging of electronics, and the removal of electric cables after discharging is complete. These electric machines rejoin the mixed product stream of electric machines on the primary conveyor 24 for transfer to the primary disassembly station 16 via a large loading robot 35 after being scanned a second time by a part tracking sensor 32 (e.g., LED and light sensor pair) and an automated identification unit 34 (e.g., bar code scanner, QR scanner, RFID scanner, or NFC scanner), as each electric machine is likely to be disassembled in a different order than initially received by the pre-removal station 12.

Those electric machines that lack a computer readable identifier or that possess a computer readable identifier without a corresponding disassembly routine are diverted to the robot training station 14. While at the robot training station 14, a unique robotic disassembly routine is recorded for the electric machine. Each model may differ in size, shape, mass, structure, and value, and therefore individual disassembly routines are generally required. For example, bolt patterns, thread type (e.g., Phillips, hex, torx, etc.) and bolt size are also specific features to account for during robot training. The robot training station 14 includes a computer for displaying a graphical user interface (GUI) 40 and a robot 42 for developing disassembly routines. The robot training station 14 can further optionally include a scanning unit to acquire manufacturer information, a rotary table for indexing, and a larger robot for hoisting electric machines in and out of the robot training station. Routines recorded in the robot training station 14 are stored to memory that is accessible to the central controller 20 for subsequent disassembly of electric machines of the same model.

To reiterate, the registry is updated to reflect the identification (or non-identification) of each electric machine. Upon receipt of the satisfactory identification of a particular electric machine, the central controller 20 updates the registry to indicate the electric machine should proceed to the primary disassembly station 16 for disassembly. The primary disassembly station 16 includes, as part of the feed system 22, a rotary dial index, illustrated in FIG. 1 as a rotating platform 44. The rotating platform 44 is surrounded by rotating satellite platforms 46 at twelve o'clock, three o'clock, six o'clock, and nine o'clock. The satellite platforms 46 rotate independently of each other, allowing for the simultaneous dismantlement of multiple electric machines. A corresponding dismantlement robot 52 performs the primary disassembly operation, breaking down each electric machine into multiple sub-assemblies. Optionally, each satellite platform 46 is responsible for a different aspect of the disassembly operation, such that each electric machine traverses through each satellite platform in series. The rotary platform 44 can be a valuable space saver and time sever for parallel process steps using similar tooling, but sequential processing can often be performed just as efficiently using linear conveyor process flows.

Further optionally, each satellite platform 46 is specific to a certain model of electric machine, such that the feed system 22 selectively diverts specific models to specific satellite platforms 46. As noted above, the primary disassembly station 16 includes dismantlement robots 52 around the rotating platform 44. The dismantlement robots 52 conduct automated disassembly operations consistent with a disassembly routine as developed at the robot training station 14. For example, the dismantlement robots 52 remove fasteners that hold the primary components of each electric machine together. The primary components, referred to herein as sub-assemblies, may include covers, power delivery modules, inverters, motors, generators, and rare earth permanent magnet rotors. A second array of disassembly robots 54 are responsible for recovering valuable materials from these subassemblies, including printed circuit boards, mixed metals, electronic components, gears, wire harnesses, and rare earth element materials. With respect to rare earth element materials, magnet removal can include crushing, heating, or cutting laminations from the rotor, as magnets are often embedded in the laminations and affixed thereto by a potting compound.

Once the electric machines are disassembled into subassemblies, the registry is updated to reflect its primary disassembly at the central controller 20. The central controller 20 can include a programmable logic controller (PLC), a field programmable gate array (FPGA), or an application specific integrated circuit (ASIC), for example. The resulting waste materials are subject to further disassembly and sorting at the post-removal sorting station 18 for recycling or final disposal. Sorting includes directing subassemblies to their designated destination, including both active and passive modes of sorting. The sorting system is adapted to sort each sub-assembly based on its classification as a permanent magnet or other than a permanent magnet, where other value streams are processed (e.g., steel, aluminum, printed circuit boards, copper, nickel, etc.). The sorting system includes ejectors for removing a permanent magnet (or other than a permanent magnet) from a conveyor 30. The ejectors can include any device adapted to cause a permanent magnet (or other than a permanent magnet) to enter a designated bin or chute 56. In some embodiments, the ejectors include a flipper mechanism. The flipper mechanism can physically knock or divert the permanent magnets onto the designated bin or chute under control of the central controller 20. Other ejectors can include electromagnets.

Figure 3:
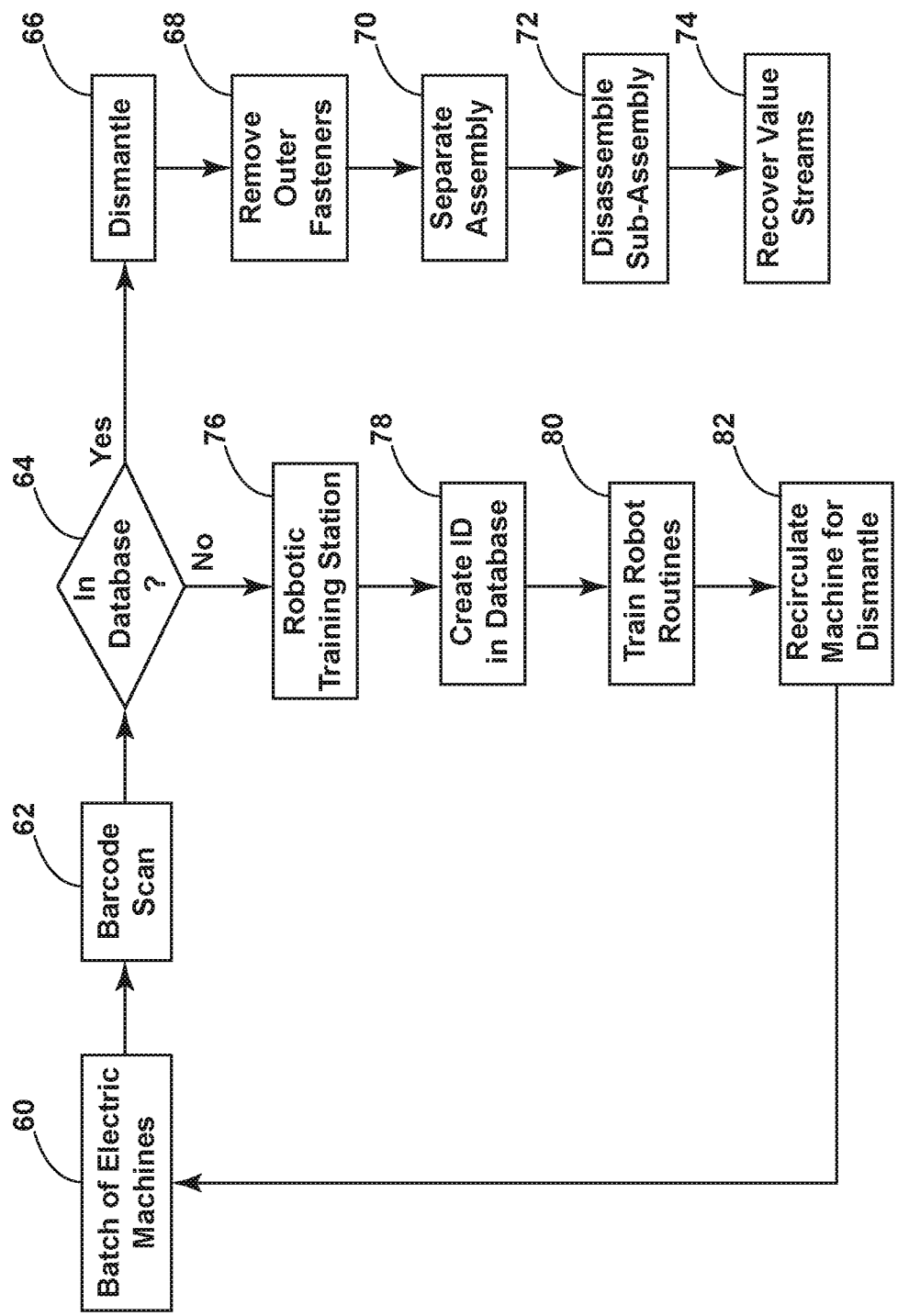
FIG. 3 is flow diagram of a method for the recovery of rare earth permanent magnets from electric machines.

Referring to FIG. 3, a method for the recovery of rare earth permanent magnets from electric machines is illustrated. In general terms, the method includes, for a mixed batch of electric machines 60, scanning each electric machine at step 62 to identify whether a disassembly routine already exists in memory at decision step 64. If a disassembly routine does exist, the electric machine proceeds to disassembly at step 66. Disassembly can include, for each electric machine, the removal of the outer fasteners at step 68, the separation of the electric machine into sub-assemblies at step 70, the disassembly of sub-assemblies at step 72, and the sorting and recovery of value streams (including rare earth permanent magnets) at step 74. If at decision step 64 the disassembly routine does not exist for the electric machine, the electric machine proceeds to the robot training station at step 76. While at the robot training station, an identifier is created at step 78, a disassembly routine is developed for the electric machine at step 80, and the electric machine is optionally recirculated into the mixed batch of electric machines at step 82, unless the electric machine is disassembled by virtue of operation step 80.

Figure 4:
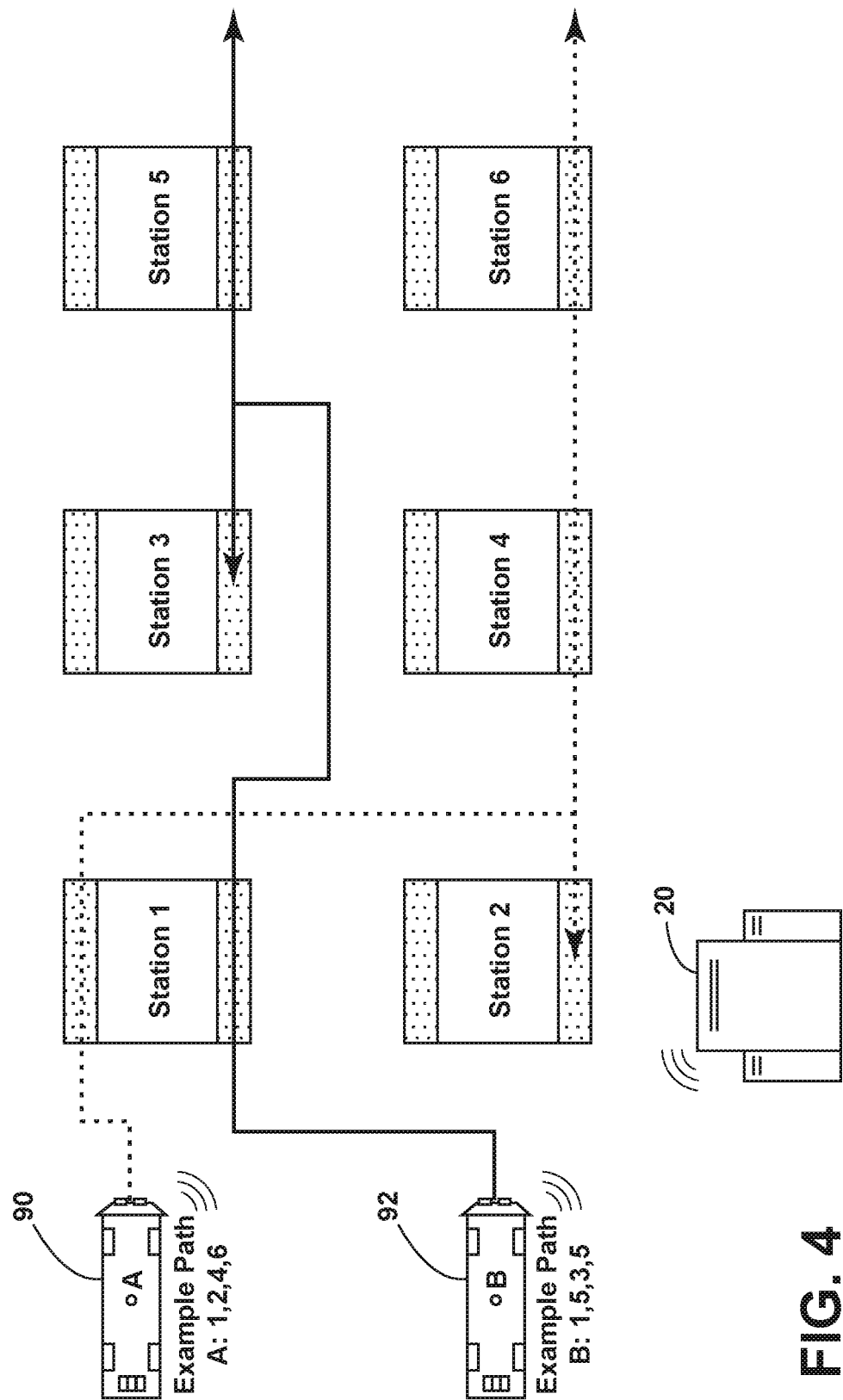
FIG. 4 is a schematic diagram of a system for the recovery of rare earth permanent magnets using autonomous guided vehicles to transport the electric machines.

As optionally shown in FIG. 4, the feed system 22 can also include multiple autonomous guided vehicles (AGVs) for transporting each electric machine. For example, two AGVs 90, 92 can transport respective electric machines (A, B) to selected disassembly stations in any appropriate order. For example, a first AGV 90 is in data communication with the central controller 20 to ferry a first electric machine A to disassembly stations in the following order: station 1, station 2, station 4, and station 6. In parallel with the disassembly of the first electric machine A, a second AGV 92 is in data communication with the central controller 20 to ferry a second electric machine B to disassembly stations in the following order: station 1, station 5, station 3, and station 5. In this example, station 1 is responsible for pre-removal operations, including the removing of fluids and the discharging electronics. The remaining stations are responsible for primary disassembly or the separation and sorting of subcomponents. While each AGV is described above as transporting a single electric machine, each AGV can instead transport two or more electric machines of the same model, or of different models.

To reiterate, the current embodiments provide a system and a method for the automated recovery of rare earth permanent magnets from electric machines. The system and the method include the automated disassembly of electric machines based on a disassembly routine stored to computer readable memory. Electric machines that are not identified are diverted to a robot training station, during which time the system and the method include creating an identifier for the electric machine and implementing a suitable disassembly routine. The remaining electric machines proceed to a rotary platform having multiple stations for the simultaneous disassembly of multiple electric machines. While at post-removal sorting station 18, rare earth permanent magnets are sorted for recycling. Recovered materials can include Nd—Fe—B permanent magnets and Sm-Co permanent magnets, and the foregoing system and method is believed to provide a throughput of 160 electric motors per day, or roughly 20 electric motors per hour, providing a scalable, financially viable solution to the anticipated shortage of REEs.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for recovering rare earth permanent magnets from a plurality of electric machines, the method comprising:
   transporting the plurality of electric machines along a primary conveyor, the plurality of electric machines including at least two dissimilar electric machines in a mixed product stream;
   determining, for each of the plurality of electric machines on the primary conveyor, whether an associated disassembly routine is stored to a computer readable memory;
   transporting those of the plurality of electric machines having an associated disassembly routine to a primary disassembly station and diverting those of the plurality of electric machines lacking an associated disassembly routine to a robot training station;

disassembling, at the primary disassembly station, those of the plurality of electric machines having an associated disassembly routine, the primary disassembly station including a primary rotating platform and a plurality of satellite platforms for removing rare earth permanent magnets from dissimilar electric machines; and developing a disassembly routine for those of the plurality of electric machines lacking an associated disassembly routine and updating the computer readable memory for subsequent ones of the plurality of electric machines of an identical model, wherein determining whether an associated disassembly routine is stored to the computer readable memory includes scanning an identifier associated with each of the plurality of electric machines using a first identification unit and a second identification unit.

2. The method of claim 1 further including directing the plurality of electric machines to preparation stations for removing of fluids and discharging electronics prior.

3. The method of claim 1 wherein the first identification unit is adapted to read a bar code, a quick response code, a radio frequency identification tag, or a near field communication tag.

4. The method of claim 1 further including scanning the identifier associated with each of the plurality of electric machines using the second identification unit after removing fluids and discharging of electronics of the plurality of electric machines.

5. A method for recovering rare earth permanent magnets from a plurality of electric machines, the method comprising:

transporting the plurality of electric machines along a primary conveyor, the plurality of electric machines including at least two dissimilar electric machines in a mixed product stream;

determining, for each of the plurality of electric machines on the primary conveyor, whether an associated disassembly routine is stored to computer readable memory;

transporting those of the plurality of electric machines having an associated disassembly routine to a primary disassembly station and diverting those of the plurality of electric machines lacking an associated disassembly routine to a robot training station;

disassembling, at the primary disassembly station, those of the plurality of electric machines having an associated disassembly routine stored to the computer readable memory, the primary disassembly station including a primary rotating platform and a plurality of satellite platforms for removing rare earth permanent magnets from dissimilar electric machines; and developing a disassembly routine for those of the plurality of electric machines lacking an associated disassembly routine and updating the computer readable memory for subsequent ones of the plurality of electric machines of an identical model, wherein each of the plurality of satellite platforms includes an associated robot that is adapted to disassemble a different type of electric machine.

6. A method for recovering rare earth permanent magnets from a plurality of electric machines, the method comprising:

transporting the plurality of electric machines along a primary conveyor, the plurality of electric machines including at least two dissimilar electric machines in a mixed product stream;

determining, for each of the plurality of electric machines on the primary conveyor, whether an associated disassembly routine is stored to computer readable memory;

transporting those of the plurality of electric machines having an associated disassembly routine to a primary disassembly station and diverting those of the plurality of electric machines lacking an associated disassembly routine to a robot training station;

disassembling, at the primary disassembly station, those of the plurality of electric machines having an associated disassembly routine, the primary disassembly station including a primary rotating platform and a plurality of satellite platforms for removing rare earth permanent magnets from dissimilar electric machines; and developing a disassembly routine for those of the plurality of electric machines lacking an associated disassembly routine and updating the computer readable memory for subsequent ones of the plurality of electric machines of an identical model, wherein each of the plurality of satellite platforms includes an associated robot that is adapted to simultaneously disassemble identical electric machines.

7. The method of claim 1 further including separating magnetic material from non-magnetic material after the disassembly of the plurality of electric machines.

8. The method of claim 1 further including a plurality of secondary conveyors associated with the plurality of satellite platforms, respectively.

9. The method of claim 1 wherein the plurality of electric machines includes a mixed batch of electric motors from automobile drivetrains.

* * * * *